United States Patent [19]

Wagner

[11] 4,360,221
[45] Nov. 23, 1982

[54] TORSION BAR AXLE SUSPENSION

[75] Inventor: Ernest W. Wagner, Cottonwood, Ariz.

[73] Assignee: Caterpillar Tractor Co., Peoria, Ill.

[21] Appl. No.: 273,887

[22] PCT Filed: Oct. 27, 1980

[86] PCT No.: PCT/US80/01440
§ 371 Date: Oct. 27, 1980
§ 102(e) Date: Oct. 27, 1980

[87] PCT Pub. No.: WO82/01518
PCT Pub. Date: May 13, 1982

[51] Int. Cl.³ .............................................. B60G 19/00
[52] U.S. Cl. ..................................... 280/689; 267/57; 280/721
[58] Field of Search ................... 280/111, 112 R, 721, 280/689, 723; 267/57 R; 180/73 TT, 73 TC

[56] References Cited

U.S. PATENT DOCUMENTS

| | | | |
|---|---|---|---|
| 3,311,389 | 3/1967 | Barton | 280/489 |
| 3,321,216 | 5/1967 | Carter | 280/489 |
| 3,337,236 | 8/1967 | Peterson | 267/11 R |
| 3,549,168 | 12/1970 | Swanson | 280/124 |
| 3,680,892 | 8/1972 | Olthoff | 280/489 |
| 3,963,086 | 6/1976 | Mason | 180/51 |
| 4,049,071 | 9/1977 | Stedman | 180/73 TL |
| 4,094,532 | 6/1978 | Johnson | 280/695 |
| 4,140,333 | 2/1979 | Thoraval | 280/721 |
| 4,261,591 | 4/1981 | Warne | 280/675 |

*Primary Examiner*—Joseph F. Peters, Jr.
*Assistant Examiner*—John A. Carroll
*Attorney, Agent, or Firm*—Phillips, Moore, Weissenberger, Lempio & Majestic

[57] ABSTRACT

An axle suspension system wherein shock-absorbing members (31,32) allow vertical movement of an axle (25) relative to a frame (16). Unequal vertical movement of the ends of the axle (25) is restrained by a torsion bar (40) spaced from and parallel to the axle and mounted (41,42) on the frame for axial rotation and by rods (46-49) extending between the ends of the torsion bar (40) and the axle (25), the rods each having a non-rotatable connection (53a-d) with the torsion bar (40) and a universal connection (58a-d) with the axle (25). Unequal vertical movement of the ends of the axle (25) imposes a torque on the torsion bar (40) which resists such axle movement. The axle suspension system has particular utility in single-axle tractor units of tractor-scraper vehicles.

10 Claims, 5 Drawing Figures

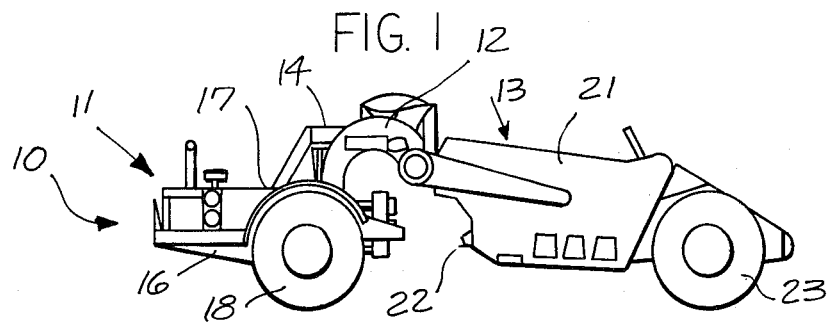
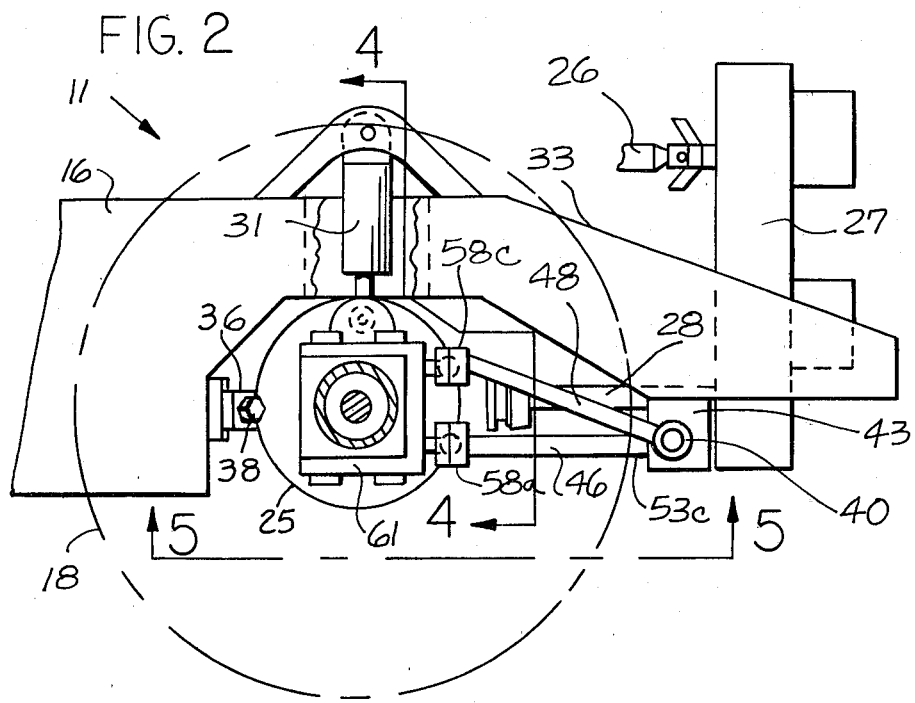
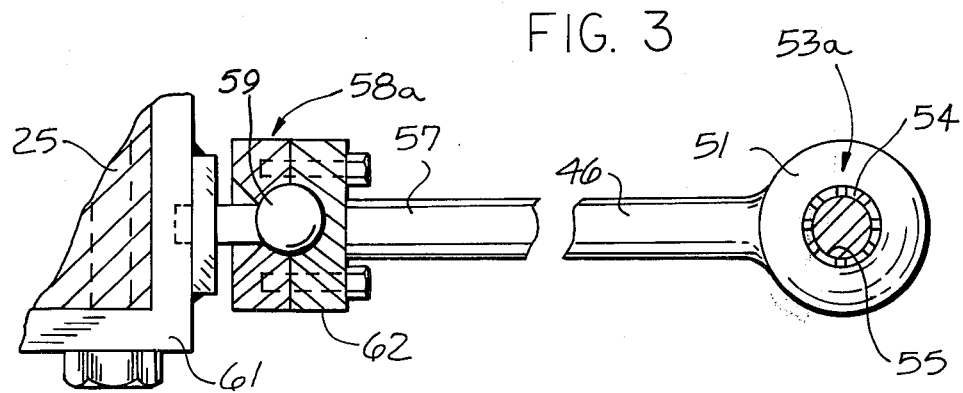

TORSION BAR AXLE SUSPENSION

DESCRIPTION

TECHNICAL FIELD

This invention relates to axle suspension systems for vehicles wherein the vehicle frame and axle are structurally interconnected for shock-absorbing vertical movement between the axle and frame.

BACKGROUND ART

Tractor-scraper vehicles are used in many construction applications, road building being probably the most common example, to transport heavy loads of material such as dirt, shot rock, gravel or the like from one location to another in conjunction with whatever construction is being carried on, and also for loading, spreading and grading of such material. Typically, tractor-scraper vehicles have a single-axle tractor unit and a single-axle scraper unit, the unit being interconnected by a hitch which allows relative pivotal movement of the units about a vertical axis.

In general, the operators like to "feel" what the vehicle is doing. If the axles of the units are unsuspended, or very stiffly suspended, relative to the frame, this is no problem since the operator will feel every bump that the tractor or scraper hits. However, this results in a rather uncomfortable and tiring ride and therefore shock absorbing axle suspensions are generally used in the tractor unit.

Typically such an axle-suspension system includes a pair of structural links or arms, one on each side of the longitudinal centerline of the vehicle, which interconnect between the axle and frame to hold the axle against forward or rearward movement relative to the frame while allowing the axle to move vertically relative to the frame, and a pair of shock-absorbing devices, one on each side of the longitudinal centerline of the vehicle which interconnect between the axle and frame to hold the frame at a desired level above the axle while permitting vertical movement of the axle relative to the frame in case when the vehicle wheels go over bumps or drop into ground depressions. In tractor units, such shock-absorbing devices commonly include a hydraulic cylinder between the axle and frame and a pressurized accumulator which functions to cause cylinder extension or retraction in response to changes in the loading on the cylinders as the vehicle goes over rough ground.

Such shock-absorbing suspensions introduce "roll-flex" into the system, i.e. an ability of one side of the axle to move up or down relative to the other side, when one wheel of the vehicle hits a bump or drops into a depression.

If the amount of roll-flex permitted by the suspension system is relatively great, the operator will be disturbed because he will not "feel" the bumps or depressions that a wheel of the tractor will hit and will consider that he does not have full control of the machine. The operator will also be disturbed in vehicle operation, after a tractor wheel has hit a bump which is not much noticed by the operator, by the sudden roll or motion introduced into the tractor through the hitch when the corresponding and unsuspended wheel of the scraper hits the same bump.

The amount of roll-flux can be reduced by increasing the stiffness of the structural supports interconnecting the frame and axle to restrain the axle against lengthwise inclination as bumps and depression are encountered by the wheels. However, the greater the amount of such restraint, the more severe are the twisting forces imposed on the structural supports and on their interconnections with the axle and with the frame.

Accordingly, there is a problem of providing an axle suspension system which allows shock-absorbing vertical movement of the axle relative to the frame and in which roll-flex is limited without undue imposition of forces on the structural support for the system.

DISCLOSURE OF THE INVENTION

The present invention is directed to overcoming one or more of the problems set forth above.

In one aspect of the invention, and in a vehicle having a pair of shock-absorbing members connected between the vehicle axle and vehicle frame for enabling relative vertical movement of the frame and axle, a torsion bar is rotatably mounted on the frame, the torsion bar being spaced from and parallel to the axle, and first and second rods extend from the torsion bar to the axle, one rod being on each side of the longitudinal centerline of the frame, with both rods being non-rotatably connected to the torsion bar.

The foregoing and other aspects of the invention will become apparent from the following detailed description of the invention when considered with the accompanying drawings.

BRIEF DESCRIPTION OF THE DRAWINGS

FIG. 1 is a side elevation of a tractor-scraper vehicle embodying the present invention.

FIG. 2 is a side elevation, partly in section, partly in phantom, and on an enlarged scale, of a portion of the tractor unit of FIG. 1, showing the axle suspension of the present invention in more detail.

FIG. 3 is an enlarged elevational view, partly in section, of one of the axle suspension rods of the present invention, showing its connections to the axle and torsion bar.

DESCRIPTION OF THE PREFERRED EMBODIMENT

Figure 4:
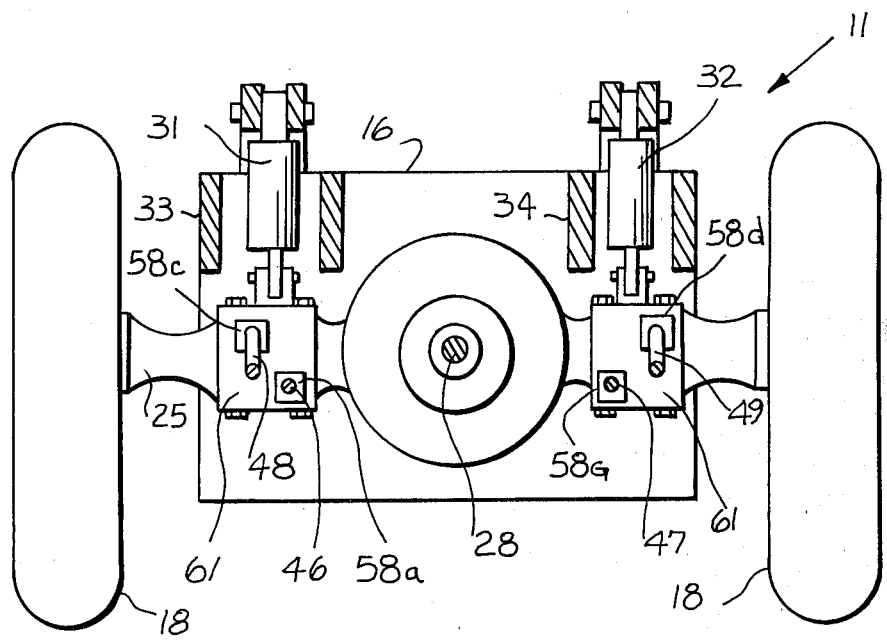
FIG. 4 is an elevational sectional view of the axle suspension of FIG. 2, taken on line 4—4 thereof.

Referring now to the drawings, wherein is illustrated a preferred embodiment of the invention, FIG. 1 illustrates a tractor-scraper vehicle 10 having a single-axle tractor unit 11 connected by hitch 12 to a single-axle scraper unit 13 for pivotal movement about a vertical axis at 14. Tractor unit 11 includes a frame 16, an operator's station 17, and is supported by a pair of ground-engaging front drive wheels 18. Scraper unit 13 includes a bowl 21 in which material is carried, a scraper blade 22 and a pair of ground-engaging rear support wheels 23.

Figure 5:
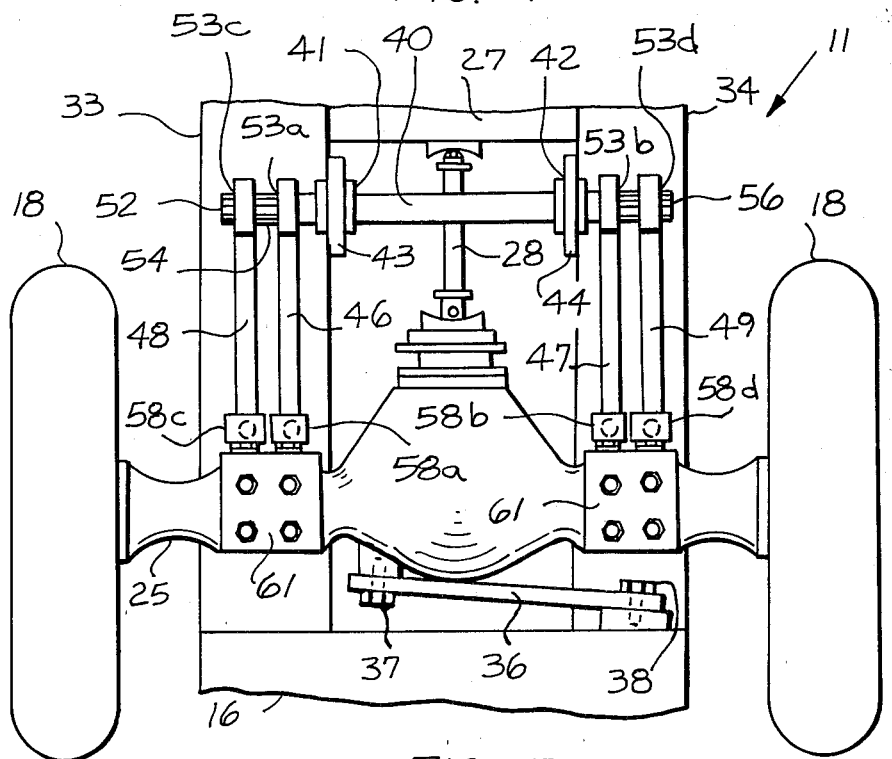
FIG. 5 is a bottom view of the axle suspension of FIG. 2, as seen from line 5—5 thereof.

Referring now more specifically to FIGS. 2, 4 and 5, drive wheels 18 of the tractor unit 11 are mounted on the ends of drive axle 25 which is transverse to the longitudinal centerline of frame 16, with power being supplied to the wheels from the tractor engine (now shown) by drive shaft 26, change-speed gear transmission 27 and shaft 28.

A pair of shock-absorbing members, shown herein as hydraulic cylinders 31 and 32, are provided, one on each side of and outwardly from the longitudinal centerline of frame 16, each cylinder having its lower end connected to axle 25 and its upper end connected to one of a pair of rear outriggers 33 and 34 of frame 16.

Cylinders 31 and 32 are connected in a suitable hydraulic system (not shown) to hold frame 16 at a desired level above axle 25, with contraction or extension of the cylinders 31,32 occurring in response to changes in loading on the cylinder as the vehicle travels over bumpy ground so that relative vertical movement of the frame and axle can occur to absorb the shocks of such travel.

A stabilizer link 36, extending generally parallel to axle 25 is pivotally connected at 37 to axle 25 and at 38 to frame 16 and serves to prevent lengthwise movement of axle 25 relative to frame 16.

In accordance with the present invention, an elongated, circular in cross-section, torsion bar 40 is mounted on frame 16 for axial rotation, torsion bar 40 being spaced rearwardly from and parallel to axle 25. More particularly, torsion bar 40 is mounted in bearings 41 and 42, which are supported by brackets 43 and 44 fixed to the rear frame outriggers 33 and 34, so that the torsion bar 40 is supported outwardly from and on opposite sides of the longitudinal centerline of frame 16.

First and second rods 46 and 47, one on each side of the longitudinal centerline of frame 16, and third and fourth rods 48 and 49, also one on each side of the longitudinal centerline of frame 16, extend forwardly from torsion bar 40 to axle 25. As seen in FIGS. 3 and 5 the rear end 51 of rod 46 is non-rotatably connected to end 52 of torsion bar 40 by a splined connection 53a formed by splines 54 on torsion bar 40 and the complementary shaped opening 55 through the rear rod end 51. Rod 48 is connected to end 52 of torsion bar 40 and rods 47 and 49 are connected to the opposite end 56 of torsion bar 40 by similar non-rotatable spline connections 53c, 53b, and 53d, respectively.

Also, as shown in FIGS. 3, 4, and 5, the forward end 57 of rod 46 is connected to axle 25 by a universal joint connection 58a, comprised, for example, by ball 59 on C-shaped bracket 61, which is bolted to axle 25, and socket member 62 on the forward end 57 of rod 46. In like manner, similar universal joint connections 58b, 58c and 58d respectively connect the forward ends of rods 47,48 and 49 to axle 25.

Rods 46 and 47 are identical in length and rods 48 and 49 are identical in length. Rods 46 and 47 are parallel to each other and rods 48 and 49 are parallel to each other when axle 25 and torsion bar 40 are parallel to each other. The axle connections 58a and 58c of rods 46 and 48 are vertically spaced from each other, and the axle connection 58b and 58d of rods 47 and 49 are likewise vertically spaced from each other.

The spline connections 53a,b,c,d, torsion bar 40, bearings 41 and 42 and brackets 43 and 44 together function to prevent lengthwise movement of the rods 46-49 relative to the frame, so that, in conjunction with the vertical spacing between the sets of universal joint connections 58a,c and 58b,d which connect the rods 46-49 to axle 25, axle 25 is stabilized against rotation about its lengthwise axis.

In operation, if the axle 25 seeks to move vertically relative to the frame, and if both ends move vertically by the same amount, the rods 46-49 will cause both ends of the torsion bar 40 to rotate in bearings 41 and 42 and by the same amount. Since torsion bar 40 is free to rotate about its axis, equal vertical movement of the ends of axle 25 relative to frame 16 is not impeded.

However, if the terrain is such that one end of axle 25 seeks to move vertically more than the other end, i.e. a roll-flex condition, such unequal vertical movement of the axle ends will cause rods 46-49 to apply a torsional force to the ends of the torsion bar 40 and the torque resistance of such bar will serve to resist such unequal axle end movement and thereby restrain the roll-flex of the axle.

The described axle suspension system also reduces considerably the undesirable stresses encountered during roll-flex. The structural connection of the axle 25 to the frame for movement of the axle about a horizontal axis, i.e. the axis of torsion bar 40 as shown herein, will impose a torsional force on the axle when there is unequal vertical movement of the axle ends and the axes of axle 25 and torsion bar 40 are moved out of parallelism with each other. In the present system, a considerable amount of such torsional force on the axle is, in effect, shifted out from the axle to the less stiff torsion bar, so that the unwanted torque stress applied to the axle is significantly reduced.

Additionally, the separate universal joint connections 58a,b,c,d between the ends of rods 46-49 to the axle allows individual movement of the ends of the rods relative to the axle as needed so that a torque force on the axle does not impose a shearing force on such connections.

Further, with the present suspension system, the bending forces imposed on the torsion rod 40 due to roll-flex are minimized so that undesirable loadings on the bearings 41 and 42 in a direction other than axial of the bearings are likewise minimized.

INDUSTRIAL APPLICABILITY

Although the present invention has broader application, it is of particular usefulness in the axle suspension of a tractor unit of a tractor-scraper vehicle.

In addition to the direct advantage of restraining roll-flex with a minimum of undesired stresses, the present invention has several other advantages.

In general, the greater the force that an axle must withstand, the more complicated the design thereof and the greater the cost. Since the present invention reduces the torsional forces on the axle, the axle design is simplified and a lighter and lower-cost axle can be used.

Also in general, the greater the amount of unsprung weight, i.e. the weight of the axle, wheels and other elements which move up and down therewith relative to the frame, the more difficult and expensive it is to provide a suitable shock absorbing system.

In the present invention the rods 46-49 are relatively light in comparison to the considerably more massive support members which have been previously used to structurally connect the axle to the frame. Accordingly, if the present torsion bar suspension is used, a significant reduction in unsprung weight will be obtained even though the axle remains the same. A further reduction in unsprung weight will, of course, be realized if a lighter axle, designed to meet the lower torque loading therein, is used in conjunction with the torsion bar suspension.

I claim:

1. In a suspension system for a vehicle (10) having a frame (16), an axle (25) transverse to the longitudinal centerline of said frame (16) and a pair of shock-absorbing members (31,32) connected between said frame (16) and axle (25) to enable relative vertical movement between said frame (16) and axle (25), the improvement comprising:

a torsion bar (40) spaced from and parallel to said axle (25);

bearing means (41,42) for rotatably mounting said torsion bar (40) on said frame (25) outwardly from and on opposite sides of said longitudinal centerline;

first and second rods (46,47) one on each side of said longitudinal centerline, said rods (46,47) each extending from said torsion bar (40) to said axle (25);

first means (53a,53b) for non-rotatably connecting both of said rods (46,47) to said torsion bar (40);

second means (58a,58b) for connecting both of said rods (46,47) to said axle (25).

2. The suspension system according to claim 1 wherein said first and second rods (46,47) are identical in length and are parallel to each other when said torsion bar (40) and said axle (25) are parallel to each other.

3. The suspension system according to claim 1 wherein said second means (58a,58b) is a universal joint connection (58a,58b) between each of said rods (46,47) and said axle (25).

4. The suspension system according to claim 1 wherein said first means (53a,53b) is a spline connection (53a,53b) between each of said rods (46,47) and said torsion bar (40).

5. The suspension system according to claim 1, the improvement further comprising:

third and fourth rods (48,49) said third rod (48) being on the same side of said longitudinal centerline as said first rod (47) and said fourth rod (49) being on the same side of said longitudinal centerline as said second rod (47), third means (40–44,53c,53d) for preventing lengthwise movement of both of said third and fourth rods (48,49) relative to said frame, fourth means (58c,58d) for connecting both of said third and fourth rods (48,49) to said axle with the connection (58c) of said third rod (48) to said axle (25) being vertically spaced relative to the connection (58a) of said first rod (46) to said axle (25) and with the connection (58d) of said fourth rod (49) to said axle being vertically spaced relative to the connection (58b) of said second rod (47) to said axle (25).

6. The suspension system according to claim 5 wherein said first and second rods (46,47) are identical in length and are parallel to each other when said torsion bar (40) and axle (25) are parallel to each other and wherein said third and fourth rods (48,49) are identical in length and are parallel to each other when said torsion bar (40) and said axle (25) are parallel to each other.

7. The suspension system according to claim 5 wherein said second and fourth means (58a,58b,58c,58d) is a universal joint connection (58a,58b,58c,58d) of each of said rods (46,47,48,49) to said axle (25).

8. The suspension system according to claim 7 wherein said first means (53a,53c) and said third means (40–44,53c,53d) include a spline connection (53a,53b,53c,53d) of each of said first, second, third, and fourth rods (46,47,48,49) to said torsion bar (40).

9. The suspension system according to claim 5 wherein said torsion bar (40) is spaced rearwardly from said axle (25) and said first, second, third and fourth rods (46,47,48,49) all extend forwardly from said torsion bar (40) to said axle (25).

10. The suspension system according to claim 1 wherein said vehicle 10 is a tractor-scraper having a single-axle tractor unit (11) and a single-axle scraper unit (13) and wherein said axle (25) and said frame (16) are parts of said tractor unit (11).

* * * * *